US012576978B2

(12) United States Patent
Bohm

(10) Patent No.: US 12,576,978 B2
(45) Date of Patent: Mar. 17, 2026

(54) ELECTRICALLY POWERED PROPELLER SYSTEMS INCLUDING AN EXHAUST SYSTEM FOR BATTERY THERMAL MANAGEMENT

(71) Applicant: Electric Power Systems, Inc., North Logan, UT (US)

(72) Inventor: Ryan Bohm, North Logan, UT (US)

(73) Assignee: ELECTRIC POWER SYSTEMS, INC., North Logan, UT (US)

( * ) Notice: Subject to any disclaimer, the term of this patent is extended or adjusted under 35 U.S.C. 154(b) by 0 days.

(21) Appl. No.: 18/997,365

(22) PCT Filed: Jul. 21, 2023

(86) PCT No.: PCT/US2023/028411
§ 371 (c)(1),
(2) Date: Jan. 21, 2025

(87) PCT Pub. No.: WO2024/020222
PCT Pub. Date: Jan. 25, 2024

(65) Prior Publication Data
US 2025/0256854 A1     Aug. 14, 2025

Related U.S. Application Data

(60) Provisional application No. 63/391,675, filed on Jul. 22, 2022.

(51) Int. Cl.
*B64D 27/32* (2024.01)
*B64D 27/34* (2024.01)
(Continued)

(52) U.S. Cl.
CPC ............. *B64D 27/32* (2024.01); *B64D 27/34* (2024.01); *B64D 27/357* (2024.01); *B64D 27/402* (2024.01); *B64D 33/08* (2013.01)

(58) Field of Classification Search
CPC ...... B64D 27/32; B64D 27/34; B64D 27/357; B64D 27/402; B64D 33/08
(Continued)

(56) References Cited

U.S. PATENT DOCUMENTS

2011/0206951 A1     8/2011   Ford et al.
2014/0298799 A1     10/2014  Wu et al.
(Continued)

FOREIGN PATENT DOCUMENTS

WO     2022029380     2/2022
WO     2024020222     1/2024

OTHER PUBLICATIONS

ISA, International Search Report and Written Opinion dated Oct. 24, 2023 in International Serial No. PCT/US2023/028411.
(Continued)

*Primary Examiner* — Brady W Frazier
(74) *Attorney, Agent, or Firm* — SNELL & WILMER L.L.P.

(57) ABSTRACT

A system for an electrically powered aircraft can comprise: a truss configured to couple to a structure of an aircraft; a battery system supported by the truss, the battery system including a first array of battery modules and a second array of battery modules, the first array of battery modules operably coupled to the second array of battery modules: and an exhaust system including a first exhaust manifold, a second exhaust manifold, and a common exhaust manifold, the first exhaust manifold coupled to each battery module in the first array of battery modules, the second exhaust manifold coupled to each battery module in the second array of battery modules, and the first exhaust manifold and the second exhaust manifold each coupled to the common exhaust manifold.

19 Claims, 12 Drawing Sheets

(51) Int. Cl.

| | | |
|---|---|---|
| *B64D 27/357* | (2024.01) | |
| *B64D 27/40* | (2024.01) | |
| *B64D 33/08* | (2006.01) | |

(58) Field of Classification Search
USPC ......................................................... 244/7 R
See application file for complete search history.

(56) References Cited

U.S. PATENT DOCUMENTS

| | | | | |
|---|---|---|---|---|
| 2015/0325827 | A1 | 11/2015 | Dittmar et al. | |
| 2015/0353192 | A1* | 12/2015 | Morrison | ............... B64D 43/00 |
| | | | | 244/17.23 |
| 2016/0144969 | A1 | 5/2016 | Rawdon et al. | |
| 2016/0365612 | A1 | 12/2016 | Bradwell et al. | |
| 2019/0221802 | A1* | 7/2019 | Maguire | .............. H01M 50/211 |
| 2020/0223545 | A1 | 7/2020 | Brooks et al. | |
| 2020/0290736 | A1 | 9/2020 | McCullough et al. | |
| 2021/0053689 | A1 | 2/2021 | Lynn et al. | |
| 2021/0170908 | A1 | 6/2021 | Villanueva et al. | |
| 2022/0311083 | A1* | 9/2022 | Zhu | ........................ B60K 13/04 |
| 2023/0017711 | A1* | 1/2023 | Garanger | ................ B64C 37/02 |

OTHER PUBLICATIONS

International Bureau; International Preliminary Report on Patentability dated Jan. 28, 2025 in PCT/US2023/028411.
European Patent Office, European Search Report dated Aug. 11, 2025 in Application No. 23843733.9.

\* cited by examiner

ELECTRICALLY POWERED PROPELLER SYSTEMS INCLUDING AN EXHAUST SYSTEM FOR BATTERY THERMAL MANAGEMENT

CROSS REFERENCE TO RELATED APPLICATIONS

This application is a U.S. national stage entry under 35 U.S.C. § 371 of International Application No. PCT/US2023/ 028411 filed Jul. 21, 2023 entitled "ELECTRICALLY POWERED PROPELLER SYSTEMS." The '411 PCT claims priority to, and the benefit of, U.S. Provisional Application No. 63/391,675 filed Jul. 22, 2022, entitled "ELECTRICALLY POWERED PROPELLER SYSTEMS." Each of the foregoing applications are hereby incorporated by reference in their entirety for all purposes.

FIELD

The present disclosure relates generally to electrically powered propeller systems.

BACKGROUND

Historically, propeller systems for aircrafts have typically been powered by gas-powered engines. More recently, a push to renewable energy sources has led to development programs directed towards the production of electrically powered aircrafts. As energy density, in its current form, is lower than alternative gas-powered options, limited space options, as well as a weight impact, can provide several challenges for developing an electrically powered aircraft. Areas of the aircraft that previously did not have weight, will likely have an additional weight impact due to a new battery system to power the electrically powered aircraft, which affects a center of gravity and aerodynamic center for the aircraft. Accordingly, improved systems for an electrically powered aircraft may be desirable.

SUMMARY

A system for an electrically powered aircraft is disclosed herein. In various embodiments, the system can comprise: a truss configured to couple to a structure of an aircraft; a battery system supported by the truss, the battery system including a first array of battery modules and a second array of battery modules, the first array of battery modules operably coupled to the second array of battery modules; and an exhaust system including a first exhaust manifold, a second exhaust manifold, and a common exhaust manifold, the first exhaust manifold coupled to each battery module in the first array of battery modules, the second exhaust manifold coupled to each battery module in the second array of battery modules, and the first exhaust manifold and the second exhaust manifold each coupled to the common exhaust manifold.

In various embodiments, the truss can comprise an aft truss structure configured to couple to the structure of the aircraft, and a forward truss structure coupled to the aft truss structure, the forward truss structure configured to couple to a motor mount. The forward truss structure and the aft truss structure can be distinct and separable components. The aft truss structure can include a first mounting arrangement and a second mounting arrangement, the first mounting arrangement disposed at a forward end of the aft truss structure and the second mounting arrangement disposed at an aft end of the aft truss structure. The first mounting arrangement of the aft truss structure can be coupled to the forward truss structure, and the second mounting arrangement of the aft truss structure can be configured to couple to the structure of the aircraft.

In various embodiments, the system can further comprise a plumbing system fluidly coupled to the battery system, the plumbing system including a manifold configured to couple to one or more couplings of a thermal management system. The plumbing system can include a plurality of supply lines in fluid communication with an inlet port of the manifold, and a plurality of return lines in fluid communication with an outlet port of the manifold, and a supply line and a return line of the thermal management system can be fluidly coupled to the plumbing system in response to coupling the manifold to the one or more couplings of a supply/return system of the thermal management system. The system can further comprise a first fluid circuit and a second fluid circuit, wherein: the first fluid circuit extends from the inlet port through a first supply line, through the first array of battery modules, through a first return line and out the outlet port, and the second fluid circuit extends from the inlet port through a second supply line, through the second array of battery modules, through a second return line, and out the outlet port. The system can further comprise a third fluid circuit, wherein the third fluid circuit extends from the inlet port through a third supply line, through a third array of battery modules, through a third return line, and out the outlet port. In various embodiments, the plumbing system is without a fluid supply tank.

In various embodiments, the first exhaust manifold comprises a first inlet, a second inlet, a third inlet, and an outlet. In various embodiments, the first inlet is coupled to a first battery module in the first array of battery modules, the second inlet is coupled to a second battery module in the first array of battery modules, and the third inlet is coupled to a third battery module in the first array of battery modules.

In various embodiments, the first exhaust manifold is unitary and non-separable.

In various embodiments, the battery system further comprises a third array of battery modules coupled to the truss. The first array of battery modules and the second array of battery modules can be aligned in a longitudinal direction. The third array of battery modules can be aligned in a lateral direction and coupled to the common exhaust manifold, and the first exhaust manifold, the second exhaust manifold, and the common exhaust manifold can be distinct components. In various embodiments, the first exhaust manifold includes a first fluid conduit that extends in the longitudinal direction on a first lateral side of the system, the second exhaust manifold includes a second fluid conduit that extends in the longitudinal direction on a second lateral side of the system, and the common exhaust manifold includes at least a portion of a third fluid conduit that extends laterally from the first lateral side to the second lateral side.

In various embodiments, the system can further comprise an electric motor operably coupled to the battery system, wherein the battery system is configured to provide power to the electric motor. The system can further comprise a propellor operably coupled to the electric motor.

In various embodiment, an aircraft can comprise the system and the fuselage.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
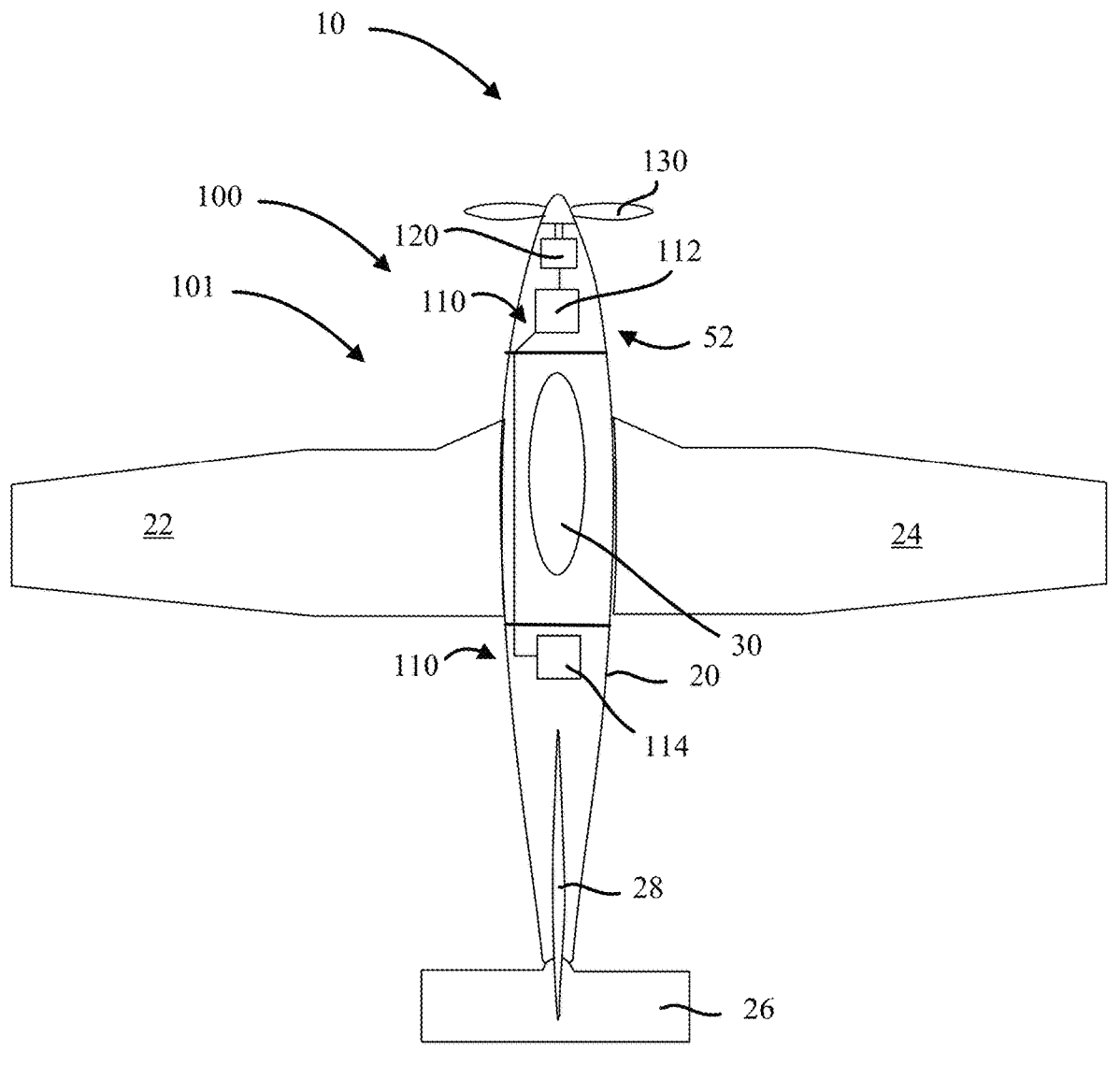
FIG. 1A illustrates a schematic view of an aircraft with a battery system, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a system for an electrically powered aircraft. In various embodiments, the system facilitates structural support, and operation of, a battery system for the electrically powered aircraft.

Exhaust System

For example, the system disclosed herein includes an exhaust system configured for thermal runaway venting. A battery cell that experiences a thermal runaway event can produce ejecta that originates from internal components of a battery cell (e.g., a lithium-ion battery cell). Additionally, debris can be generated in a battery pack from damaged module internal components. Ejecta gas can be expelled from the vehicle. The exhaust system disclosed herein is configured to facilitate venting of ejecta in response to a battery module in the battery system entering thermal runaway. The exhaust system disclosed herein is configured for relatively low weight, low cost, and ease of assembly compared to relative to potential alternative venting options.

The battery modules have a vent port, which can be a rectangular orifice, for the thermal runaway venting. Although described herein as having a rectangular orifice, the present disclosure is not limited in this regard. For example, various alternative shapes are within the scope of this disclosure, such as circular, oval, square, or any polygon type shape, etc. For ease of fabrication, cylindrical tubing in combination with fittings can be utilized to interface with the vent port. To interface the cylindrical with the rectangular, a fitting with a flange was designed. The fitting is welded to the tubing and defines an interface with the vent port.

The arrangement of the battery modules in a truss (e.g., a motor truss at a nose end of a fuselage of the electrically powered aircraft) can have two sets of three modules aligned in a longitudinal direction (e.g., from fore to aft) and each fore/aft group of three modules arranged alongside each other (e.g., disposed laterally adjacent to one another). Another series arrangement of three modules can be mounted below these two arrays of battery modules and be oriented (i.e., aligned) laterally (i.e., side to side). A first exhaust manifold coupled to each vent port for the first array of battery modules and a second exhaust manifold coupled to each vent port for the second array of battery modules (i.e., the thermal runaway vent ports on top in the system) connect to a common exhaust manifold coupled to each vent port for the third array of battery modules (i.e., the thermal runaway vent ports on the bottom) through a coupling (e.g., a quick-connect flange) that allows for each set of three modules (i.e., each of the array of battery modules) to be individually, and separately, installed and removed without destroying (e.g., cutting apart) the exhaust assembly (i.e., the welded thermal runaway vent assembly).

Structural Support System

The system disclosed herein further includes a structural support system. The structural support system is configured to provide structural support for the battery system. In various embodiments, the structural support system provides structural support for the electric motor, the propeller, and any additional components of the aircraft. The structural support system comprises a truss. The truss is configured to couple to a mounting plate, which couples to the electric motor. The mounting plate is configured to improve vibration and dampening performance, in accordance with various embodiments. For prototyping applications, which occurs in development stages of aircraft, removal of the electric motor may be desirable. For example, the electric motor may be removed often for inspection, to facilitate installation of instrumentation (i.e., testing equipment, etc.). Removal of fasteners (e.g., bolts) attaching the electric motor to the mounting plate could be cumbersome without the truss structure of the system disclosed herein. For example, a forward truss structure (e.g., an intermediate motor truss plate) is disclosed herein that that can be easily detached from an aft truss structure (e.g., a remaining truss structure), such as by removing four mounting fasteners (e.g., bolts) from a mounting arrangement/interface between the forward truss structure and the aft truss structure, in accordance with various embodiments.

Charging Thermal Management System

The system disclosed herein further includes a charging thermal management system. In various embodiments, typical battery systems for electric vehicles, such as electric cars, include a thermal management system to control a temperature of the battery system during operation. In various embodiments, the battery modules in the battery system designed herein are configured to remain in a desirable temperature range during operation without the use of a thermal management system in order to reduce an operational weight of the system, which can have significant benefits in aviation. However, thermally managing the battery modules during charging may be desirable. Accordingly, the charging thermal management system disclosed herein is configured to be fluidly coupled to an external thermal management system during charging as described further herein.

In various embodiments, each battery module includes liquid ports (e.g., an inlet port and an outlet port) to pass cooling fluid through an internal cold plate to remove heat (or add heat) from the cells (e.g., during charging). In various embodiments, a coolant can be passed through the battery system, only during charging of the modules, through an external connection to an external thermal management system (e.g., a refrigerated coolant supply/return system). Coolant is provided at a certain flow rate to facilitate sufficient cooling of the modules, as described further herein. The pumps on the external refrigeration system can provide a high enough pressure to provide the desired flow throughout the charging thermal management system.

In various embodiments, the charging thermal management system includes a plumbing system. The plumbing system can include various flow circuits. For example, on the aircraft, it may be desirable to split the incoming flow to various sets of modules. This can be desirable since having all modules in one series string would cause the modules farther down the string to receive warmer coolant relative to the beginning modules in the string. Additionally, pressure to maintain sufficient flow rate through the entire string could cause undue burden on the design to accommodate the higher system pressures.

In an example embodiment (e.g., a battery system with 18 battery modules modules), the thermal management system can be divided into six parallel banks (e.g., 6 banks of three modules each). However, the present disclosure is not limited in this regard. For example, any number of parallel banks could be utilized, and each bank can have the same or a different number of battery modules. In various embodiments, by having the same number of battery modules for each bank and by keeping a number of modules in the bank the same, a relatively consistent coolant temperature can be maintained during charging.

In various embodiments, the thermal management charging system comprises a manifold (e.g., a machined manifold) to which the incoming supply and outgoing return may be connected. In this regard, the manifold can comprise one or more couplings configured to interface with and couple to one or more couplings of an external thermal management system (e.g., a refrigerated coolant supply/return). In various embodiments, as described further herein, the system can include three sets of battery modules in a forward section of the aircraft (e.g., proximate a nose end in the fuselage of the aircraft) and three sets of battery modules in a rear section of the aircraft (e.g., aft of a cockpit). In various embodiments, the manifold can include three supply connections to the three sets of battery modules in the forward section and three return connections from the three sets of battery modules in the forward section. In various embodiments, the manifold also has a larger set of supply/return fittings to route to the aft section of the plane with the other three sets of modules, as described further herein.

This integrated manifold can be designed with varying orifice sizes to for fittings to accommodate different lengths of tubing to the various banks of modules. In various embodiments, this can facilitate the lightest possible manifolding system that can provide substantially equal (e.g., plus or minus 30%, or plus or minus 20%, or plus or minus 10%) flows to each bank of battery modules in the battery system.

In various embodiments, the supply/return fittings can be Army-Navy ("AN") standard quick-connect style. In various embodiments, the fittings may be oriented either straight out of the manifold or angled downward to minimize strain on the tubing due to bending.

In various embodiments, the manifold can incorporate overpressure relief to prevent an external high-pressure situation from damaging batteries and any other equipment that may be connected to the manifold. Such overpressure relief can include burst discs or other active or passive devices. The manifold may include temperature or flow sensing capabilities.

Sensing devices may be located throughout the cooling branches to indicate whether there is proper flow in each branch. Each battery module can include temperature sensing internally (i.e., for typical operations), software may be used to monitor module temperatures in each of the branches during charging. These temperatures can be compared with a table of anticipated temperatures given a certain ambient air temperature during charging, internal cabin temperature, charging current level, and other information that may be provided to the aircraft from the refrigeration system such as flow rate, supply coolant temperature, return coolant temperature, or other data. The processing of such information can determine if the coolant system is performing properly without any obstructions or limitations, as described further herein.

Figure 1B:
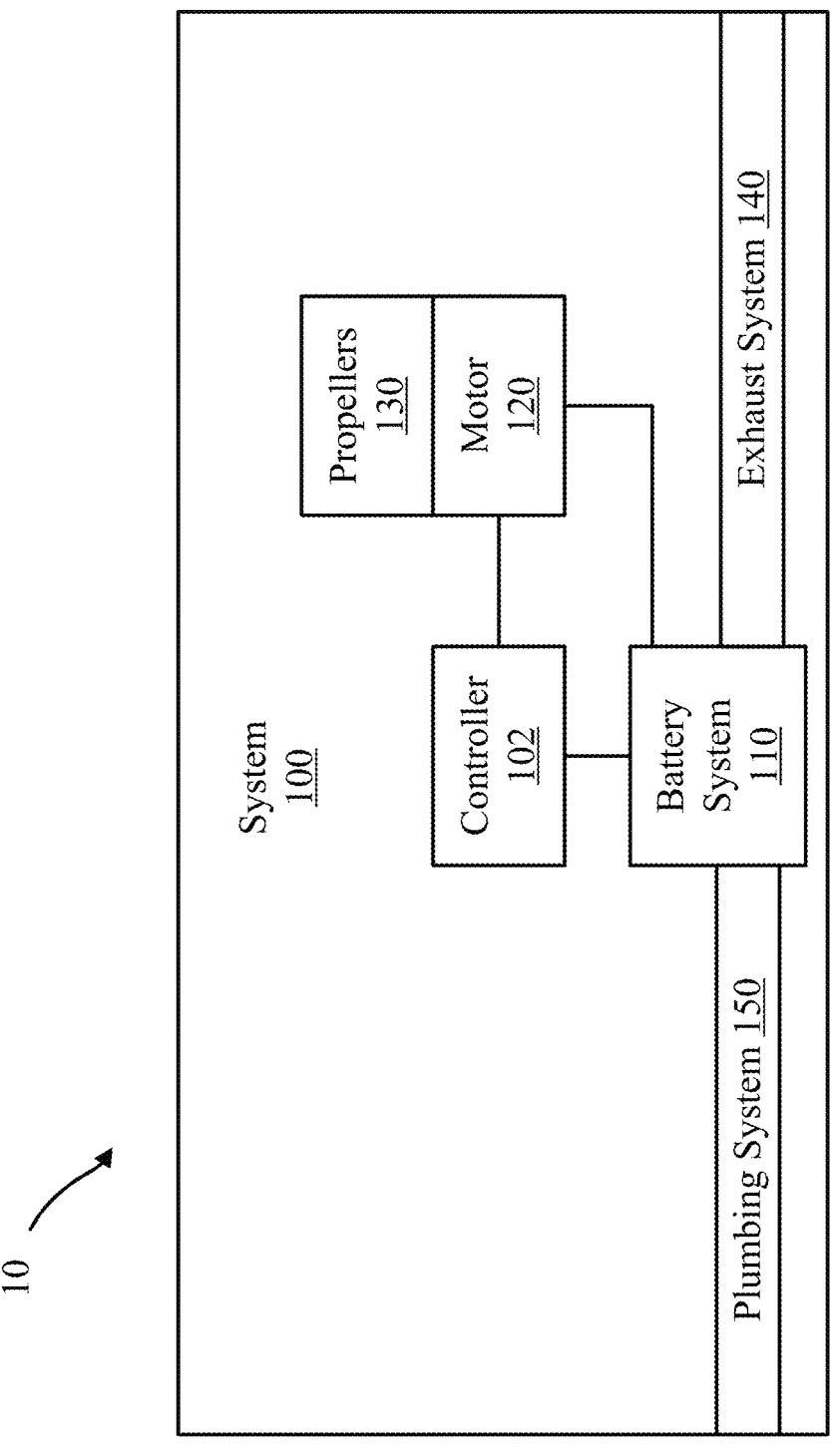
FIG. 1B illustrates a schematic view of an electrically powered propeller system, in accordance with various embodiments.
Figure 2:
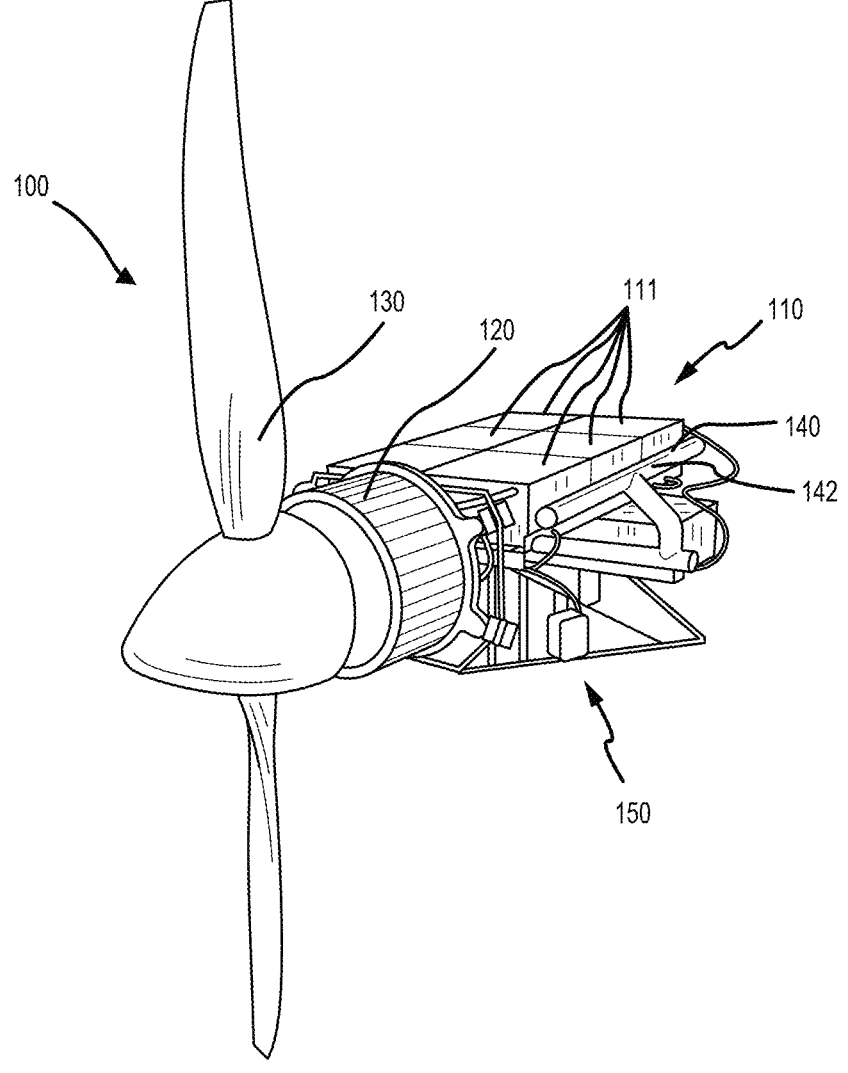
FIG. 2 illustrates a perspective view of an electrically powered propeller for use in the electrically powered propeller system, in accordance with various embodiments.

Referring to FIGS. 1A, 1B and 2, schematic views (FIGS. 1A, 1B) and a perspective view (FIG. 2) of an aircraft 10 (e.g., an electrically powered aircraft) (FIG. 1A) with a system 100 (e.g., an electrically powered propeller system) having a battery system 110 (FIGS. 1B, 2), with like numerals depicting like elements, are illustrated, in accordance with various embodiments.

In various embodiments, the aircraft 10 comprises a fuselage 20, wings 22, 24, a horizontal stabilizer 26, a vertical stabilizer 28, and a cockpit 30. The aircraft 10 as illustrated is meant to be exemplary, and one skilled in the art could think of various alternative structures that would still be within the scope of this disclosure. For example, the aircraft 10 could be without a cockpit (e.g., for an unmanned aerial vehicle), vertical stabilizers could be placed at wing tips (as opposed to an aft end of the fuselage), the horizontal stabilizer could be a canard, propellers could be disposed on the wings 22, 24, instead of, or in combination with a propeller at a nose end of the fuselage 20, etc. The present disclosure is not limited in this regard.

The aircraft 10 comprises a system 100 (an electrically powered propeller system) with various sub-systems 101 (e.g., a battery system for powering the electrically powered aircraft, an exhaust system configured for expelling ejecta from a thermal runaway event, a structural support system for providing structural support to the battery system and/or the electric motor/propeller, etc.).

In various embodiments, the system 100 comprises a controller 102, the battery system 110, the electric motor 120, and the propeller 130. The electric motor 120 is operably coupled to the propeller 130. The electric motor 120 is electrically coupled to the battery system 110. In this regard, the battery system 110 is configured to power the electric motor 120 to drive the propeller 130 and power the system 100, in accordance with various embodiments. In various embodiments, the controller 102 is configured to control a power output from the battery system 110, thereby controlling a power supply to the electric motor 120 during operation of the system 100. Stated another way, the battery system 110 is configured to provide electrical power to the electric motor 120, which is operably coupled to the propeller 130. In response to electric power being provided by the battery system 110, a force is generated that creates a torque, which causes the electric motor to spin, thereby spinning the propeller 130.

In various embodiments, the system 100 comprises a battery system 110. The battery system 110 is configured to supply electrical power to the electric motor to power the aircraft 10. Although illustrated with a single electric motor and a single propeller, the present disclosure is not limited in this regard. For example, the aircraft 10 could include multiple motors (e.g., a tri-propeller configuration, two propellers per wing, etc.). Any number of electrically powered propellers is within the scope of this disclosure.

In various embodiments, the battery system 110 comprises a first section of battery modules 112 and a second section of battery modules 114. In various embodiments, the first section of battery modules 112 is electrically, and operably, coupled to the second section of battery modules 114. Stated another way, the first section of battery modules 112 and the second section of battery modules 114 are electrically coupled to form the battery system 110 (e.g., with a predetermined power output. energy density, etc.). The first section of battery modules 112 can be disposed in a forward section 52 of the fuselage 20 (e.g., forward of the cockpit 30) and the second section of battery modules 114 can be disposed in an aft section 54 of the fuselage (e.g., aft of the cockpit and forward of the horizontal stabilizer 26). In various embodiments, by distributing the battery system 110 into more than one section (e.g., forward and aft), a weight distribution of the battery system 110 can be balanced. Stated another way, weight distribution is important for aircrafts due to the importance of the aerodynamic center and center of gravity in lift generation, balance, and maneuverability of the aircraft 10.

In various embodiments, the battery system 110 may be configured for use on an aircraft. A battery system 110, for purposes of this disclosure, includes a plurality of battery modules 111, each battery module 111 including a plurality of electrically connected cells (e.g., cell-brick assemblies, pouch cells, or the like). These electrically connected cells may, in turn, include a parallel, series, or combination of both, collection of electrochemical or electrostatic cells hereafter referred to collectively as "cells," that can be charged electrically to provide a static potential for power or released electrical charge when needed. When cells are assembled into a battery system 110, the cells are often linked together through metal strips, straps, wires, bus bars, etc., that are welded, soldered, or otherwise fastened to each cell to link them together in the desired configuration.

In various embodiments, each battery module 111 of the battery system 110 comprises a plurality of cells disposed therein and electrically coupled in series and/or parallel. A cell may comprise at least one positive electrode and at least one negative electrode. One common form of such a cell is the well-known secondary cells packaged in a cylindrical metal can or in a prismatic case. Examples of chemistry used in such secondary cells are lithium cobalt oxide, lithium manganese, lithium iron phosphate, nickel cadmium, nickel zinc, and nickel metal hydride. Such cells are mass produced, driven by an ever-increasing consumer market that demands low-cost rechargeable energy for portable electronics.

In various embodiments, the controller 102 is in operable communication (e.g., wireless or wired) with an electric motor 120. In various embodiments, controller 102 may be configured as a central network element or hub to access various systems and components of the system 100. Controller 102 may comprise a network, computer-based system, and/or software components configured to provide an access point to various systems and components of the system 100. In various embodiments, controller 102 may comprise a processor. In various embodiments, controller 102 may be implemented in a single processor. In various embodiments, controller 102 may be implemented as, and may include, one or more processors and/or one or more tangible, non-transitory memories and be capable of implementing logic. Each processor can be a general-purpose processor, a digital signal processor ("DSP"), an application specific integrated circuit ("ASIC"), a field programable gate array ("FPGA") or other programable logic device, discrete gate or transistor logic. discrete hardware components, or any combination thereof. Controller 102 may comprise a processor configured to implement various logical operations in response to execution of instructions, for example, instructions stored on a non-transitory, tangible, computer-readable medium configured to communicate with controller 102.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the battery system 110 is fluidly coupled to an exhaust system 140. The exhaust system 140 is configured to exhaust hot gases, ejecta, flames, or the like from the battery system 110 in the event of a thermal runaway event occurring in a cell in a respective battery module of the battery system 110. In various embodiments, the exhaust system 140 comprises various ducts 142 (e.g., cylindrical ducts).

The system 100 further comprises a plumbing system 150 (e.g., a portion of a charging thermal management system). In various embodiments, the plumbing system 150 is configured to be non-operational during typical operation of the aircraft 10. Stated another way, during operation of the aircraft 10, no fluid is actively flowed through the plumbing system 150. As described further herein, the plumbing system 150 is configured to interface with an external supply portion of a charging thermal management system. Stated another way, in response to the plumbing system being coupled to a supply/return system, a charging thermal management system can be formed for use during charging of the aircraft 10. The charging thermal management system can be configured to supply a fluid to the battery system 110 during charging to control a temperature of each battery module in the battery system 110. In this regard, by keeping a supply and return system off-board the aircraft, a weight of the system 100 can be greatly reduced relative to an aircraft with a system that has an entire thermal management system on-board the aircraft 10, in accordance with various embodiments.

Figure 3A:
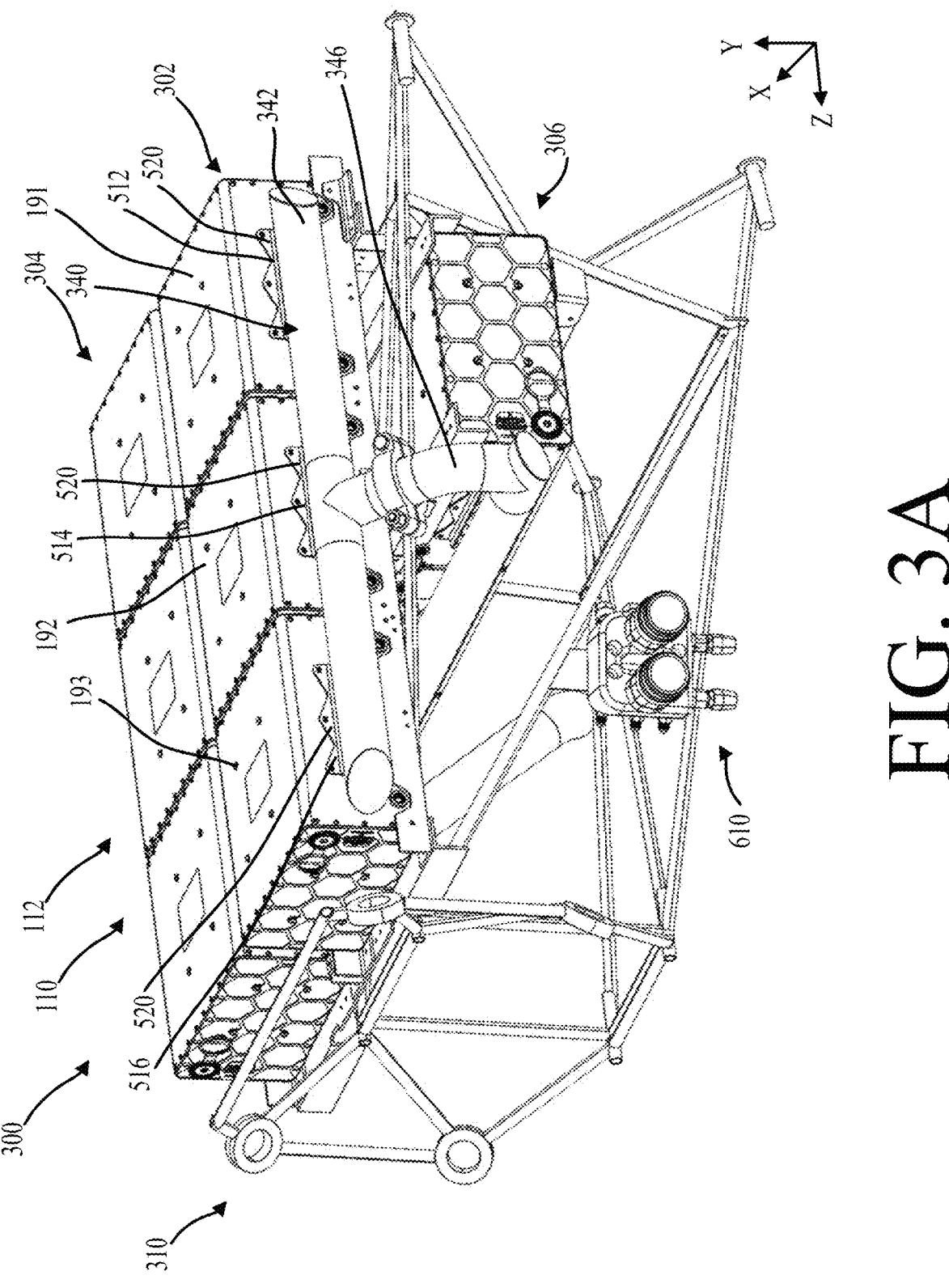
FIG. 3A illustrates a system for an electrically powered aircraft, in accordance with various embodiments.
Figure 3B:
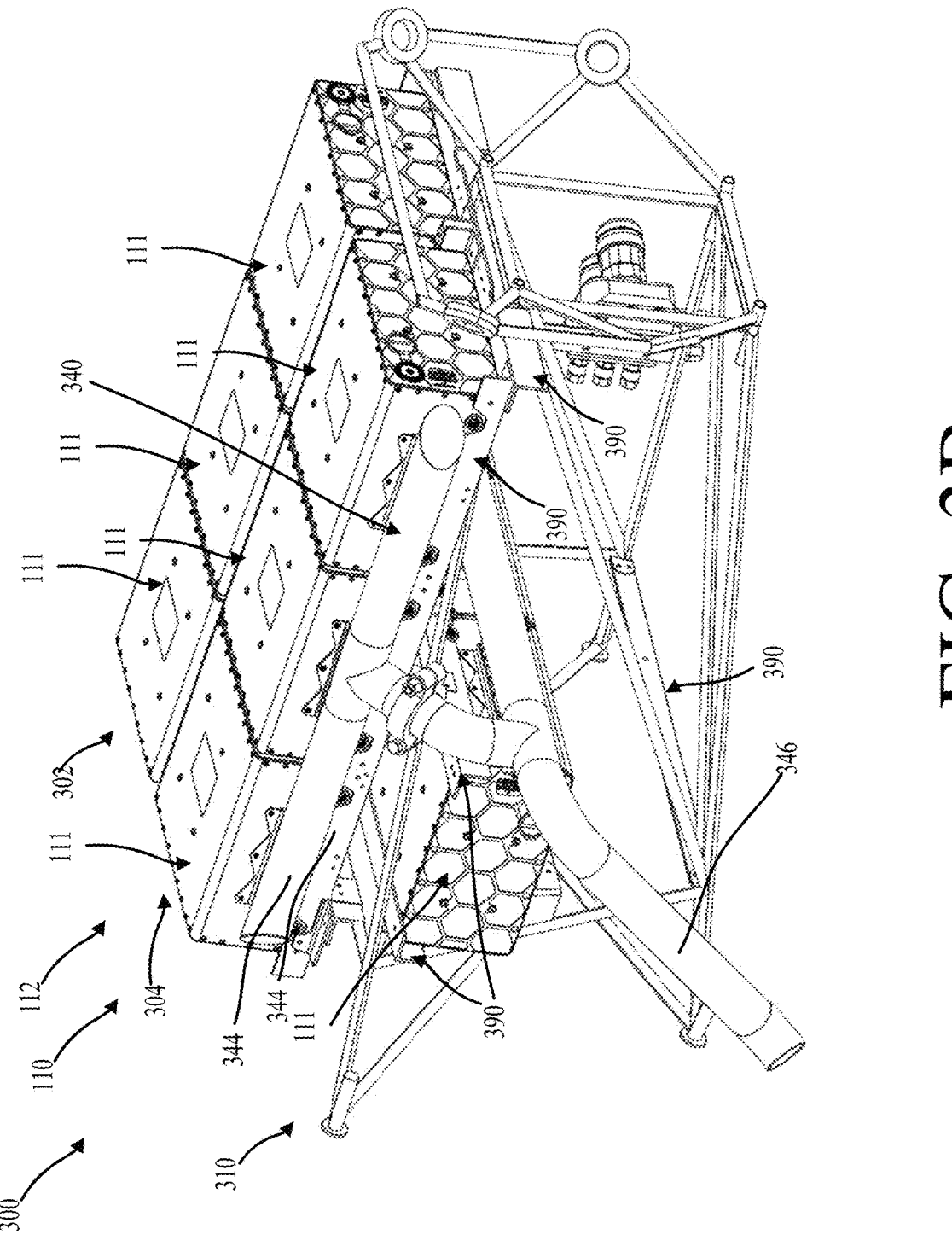
FIG. 3B illustrates a system for an electrically powered aircraft, in accordance with various embodiments.

Referring now to FIGS. 3A and 3B, perspective views of a system 300 (e.g., a structural support system in the various sub-systems 101 of the system 100 from FIG. 1A) is illustrated, in accordance with various embodiments. In various embodiments, the system 300 comprises a truss 310, at least a portion of the battery system 110 (e.g., the first section of battery modules 112), and at least an exhaust system 340. In various embodiments, the exhaust system 340 forms a portion of the exhaust system 140. In various embodiments, the first section of battery modules 112 and the second section of battery modules 114 each include a respective, distinct, and independent exhaust system, as described further herein. The truss 310 is configured to structurally support the first section of battery modules 112 and any associated components. As stated previously herein, the exhaust system 340 is configured to route ejecta from a respective battery module, in response to a cell in the respective battery module entering thermal runaway, out of the aircraft 10 from FIG. 1 via a fluid conduit, as described further herein.

In various embodiments, the first section of battery modules 112 of the battery system 110 are supported by the truss 310. The first section of battery modules 112 of the battery system 110 including a first array of battery modules 302 and a second array of battery modules 304. The first array of battery modules 302 are operably (i.e., electrically) coupled to the second array of battery modules 304 to form a portion of the battery system 110. In various embodiments, the first section of battery modules 112 further comprise a third array of battery modules 306 coupled to the truss 310.

In various embodiments, the first array of battery modules 302 and the second array of battery modules 304 can each be aligned in a longitudinal direction (i.e., the Z-direction). In this regard, the first array of battery modules 302 and the second array of battery modules 304 can include battery modules that are arranged in an array with a first battery module (e.g., first battery module 191 for the first array of battery modules 302) disposed forward of a second battery module (e.g., second battery module 192 for the first array of battery modules 302, and a third battery module (e.g., third battery module 193 for the first array of battery modules 302) disposed aft of the second battery module. In various embodiments, the second array of battery modules 304 can mirror the first array of battery modules 302 about a vertical plane (e.g., a Y-Z plane). In this regard, assembly of the first array of battery modules 302 and of the second array of battery modules 304 can be simplified (i.e., as both assemblies can be nearly identical), in accordance with various embodiments.

In various embodiments, the third array of battery modules 306 are aligned in a lateral direction (i.e., an X-direction) and coupled to the common exhaust manifold 346 in a similar manner to the first array of battery modules 302 and the second array of battery modules 304, with the exception that the battery modules are aligned laterally (i.e., in the X-direction) as opposed to longitudinally (i.e., in the Z-direction).

In various embodiments, the exhaust system 340 includes a first exhaust manifold 342, a second exhaust manifold 344, and a common exhaust manifold 346. The first exhaust manifold 342 is coupled to each battery module in the first array of battery modules 302. Similarly, the second exhaust manifold 344 is coupled to each battery module in the second array of battery modules 304. The first and second exhaust manifolds are each coupled to the common exhaust manifold 346.

Figure 4A:
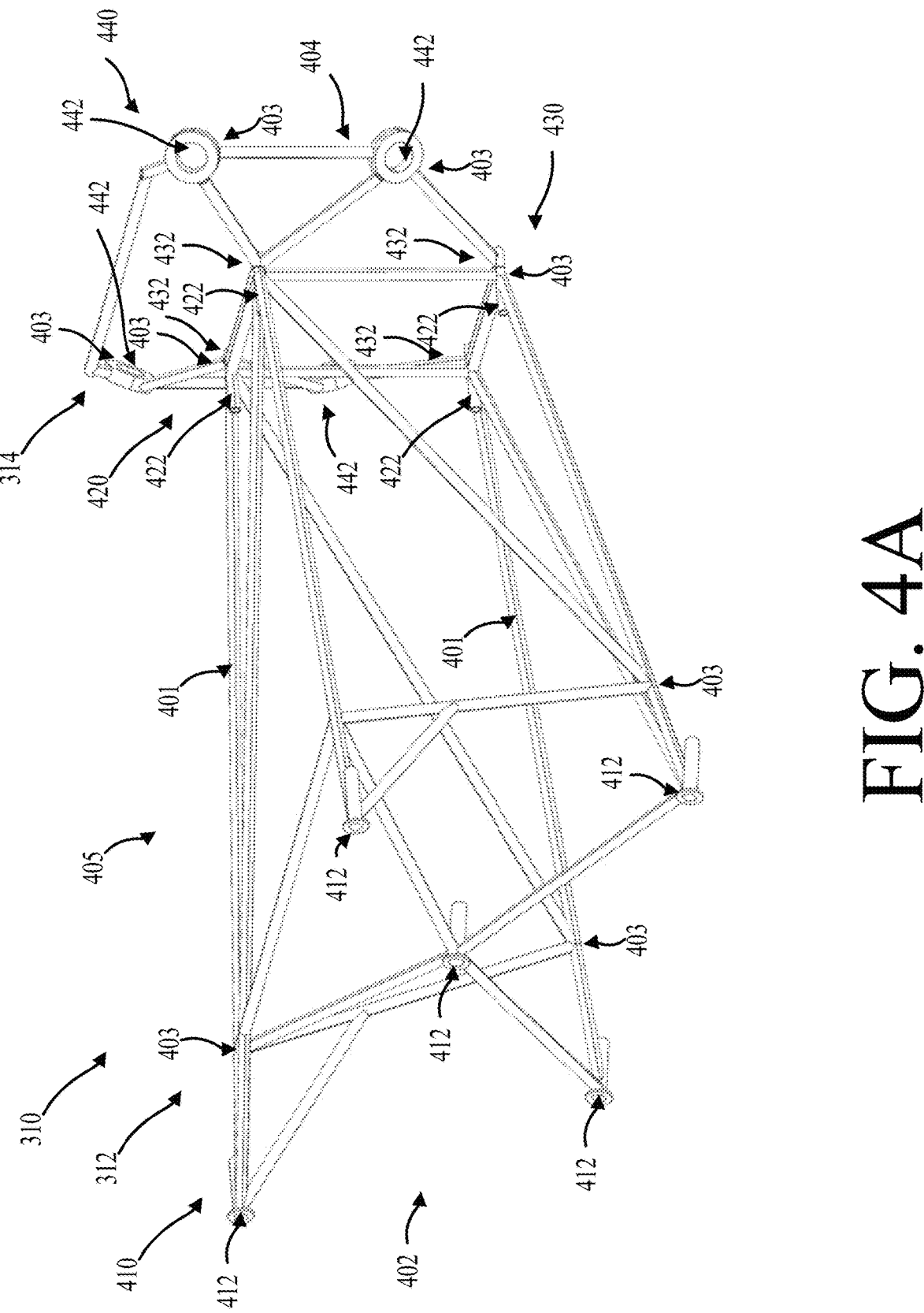
FIG. 4A illustrates a perspective view of a support structure for a battery system, in accordance with various embodiments.
Figure 4B:
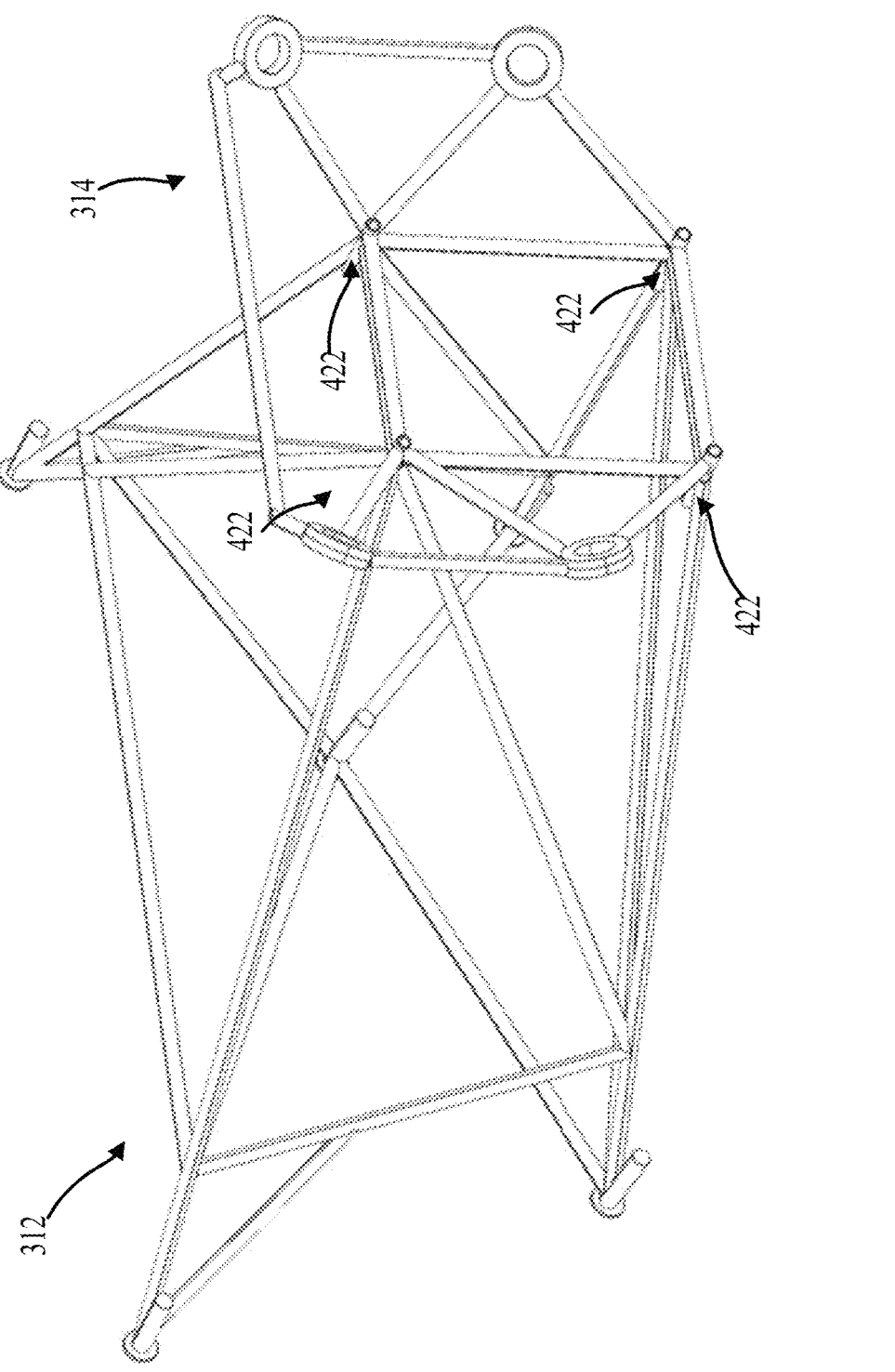
FIG. 4B illustrates a perspective view of a support structure for a battery system, in accordance with various embodiments.

With reference now to FIGS. 4A and 4B, perspective views of the truss 310 of the system 300 from FIGS. 3A and 3B are illustrated, in accordance with various embodiments. A "truss" as referred to herein is an assembly of members (e.g., beams), connected by nodes, which creates a rigid structure. For example, the truss 310 includes a plurality of beams 401 connected by nodes 403. Each node in the nodes 403 includes an intersection of at least two beams that form a truss arrangement 405 of the truss 310.

In various embodiments, the truss 310 is configured to be coupled to a structure of the aircraft 10 from FIG. 1A. For example, the truss 310 is configured to mount to a portion of the aircraft 10 (e.g., the fuselage 20 from FIG. 1) and to provide a structural support for the nose end of the fuselage 20). Additionally, as described further herein, the truss 310 is configured to structurally support the battery modules in the first section of battery modules 112 and various other components of the system 100 from FIG. 1A (e.g., an electrically powered propeller system), such as the propeller 130 and the electric motor 120.

In various embodiments, the truss 310 comprises an aft truss structure 312 and a forward truss structure 314. The aft truss structure 312 can comprise a main truss structure. The forward truss structure 314 can act as an intermediary between the aft truss structure 312 and a motor mount (e.g., a mount configured to reduce and/or isolate vibration from operation of the electric motor 120 and/or propeller 130 from FIG. 1A). In various embodiments, by having the forward truss structure 314 act as an intermediary, the aft truss structure 312 can remain consistent between designs, and any changes to the electric motor 120 (or a respective motor mount) can be accounted for by design changes to the forward truss structure 314 only. Stated another way, a design of the support structure for the first section of battery modules 112 and other components can remain consistent for various designs irrespective of design changes to the electric motor 120 (e.g., motor size or capability) and/or propeller 130 from FIG. 1.

The aft truss structure 312 is configured to couple to the structure of the aircraft 10 from FIG. 1A. For example, the aft truss structure 312 may be configured to mount to a firewall or the like via a mounting arrangement.

In various embodiments, the aft truss structure 312 is configured to couple to the structure of the aircraft 10 from FIG. 1. For example, the aft truss structure 312 comprises a first mounting arrangement 410 disposed at an aft end 402 of the aft truss structure 312. The first mounting arrangement 410 includes a plurality of mounting points 412. In various embodiments, each mounting point in the plurality of mounting points 412 can include a female fastener (e.g., a threaded insert, a helical insert, etc.). Although described herein is including a female fastener, the present disclosure is not limited in this regard. Although illustrated as including five mounting points in the plurality of mounting points 412, the present disclosure is not limited in this regard and any number of mounting points for the aft truss structure 312 is within the scope of this disclosure.

In various embodiments, the aft truss structure 312 further comprises a second mounting arrangement 420. The second mounting arrangement 420 of the aft truss structure 312 is disposed at a forward end 404 of the aft truss structure 312. Similar to the first mounting arrangement 410, the second mounting arrangement 420 comprises a plurality of mounting points 422. In various embodiments, each mounting point in the plurality of mounting points 422 can include a female fastener (e.g., a threaded insert, a helical insert, etc.). Although described herein is including a female fastener, the present disclosure is not limited in this regard.

In various embodiments, the forward truss structure 314 is coupled to the aft truss structure 312. For example, the forward truss structure 314 can include a first mounting arrangement 430 that corresponds to (i.e., is configured to interface with and couple to) the second mounting arrangement 420 of the aft truss structure 312. In this regard, the first mounting arrangement 430 of the forward truss structure comprises a plurality of mounting points 432, where each mounting point in the plurality of mounting points 432 is configured to be coupled to a respective mounting point in the plurality of mounting points 422 of the second mounting arrangement 420 of the aft truss structure 312. In various embodiments, the first mounting arrangement 430 can include an aperture to receive a respective male fastener, whereas the second mounting arrangement 420 can include a respective female fastener, or vice versa. The present disclosure is not limited in this regard.

In various embodiments, the forward truss structure 314 is further configured to couple to a motor mount. For example, the forward truss structure 314 can further comprise a second mounting arrangement 440. The second mounting arrangement 440 can include a plurality of mounting points 442. Each mounting point in the second mounting arrangement 440 can be configured to be coupled to a bushing and a motor mount to facilitate vibration isolation of the electric motor 120 from FIGS. 1A-2 as described previously herein. In various embodiments, the plurality of mounting points 442 are disposed forward and outward from the first plurality of mounting points 432 of the forward truss structure 314.

In various embodiments, the forward truss structure 314 and the aft truss structure 312 are distinct and separable components. For typical truss structures at nose ends of aircrafts, a single, unitary, truss structure couples a firewall of the aircraft 10 to a motor mount for a respective propeller assembly. This can reduce a part count for a support structure for the aircraft 10. However, by having the forward truss structure 314 and the aft truss structure 312 as separable and distinct components, the aft truss structure can be sized and configured based on an arrangement of the first section of battery modules 112 of the battery system 110 as shown in FIGS. 3A and 3B. Accordingly, a consistent structural arrangement can be achieved across multiple platforms where only a forward truss structure 314 changes as an electric motor, a propeller, or operational parameters of the electric motor or propeller changes, in accordance with various embodiments.

In various embodiments, a set of the nodes 403 that are defined by the mounting arrangements 410, 420, 430, 440 are interconnected by the beams 401 to form the truss arrangement 405. In this regard, the truss arrangement 405 is configured to structurally support at least a portion of the battery system 110 as shown in FIGS. 3A, 3B (e.g., the first section of battery modules 112), components of the plumbing system 150, components of an electrical system such as a charging interface, a battery power management system. etc., the exhaust system 140, the electric motor 120, and/or the propeller 130.

Referring back to FIGS. 3A and 3B, the system 300 can further comprise mounting brackets 390. The mounting brackets 390 can be utilized to structurally couple respective components to the truss 310. In this regard, the structural support can be provided by the truss 310, and the mounting brackets 390 can facilitate coupling between respective components (e.g., battery modules 111 in the battery system 110, components from the plumbing system 150 as described further herein, a battery power management unit, etc.).

Figure 5:
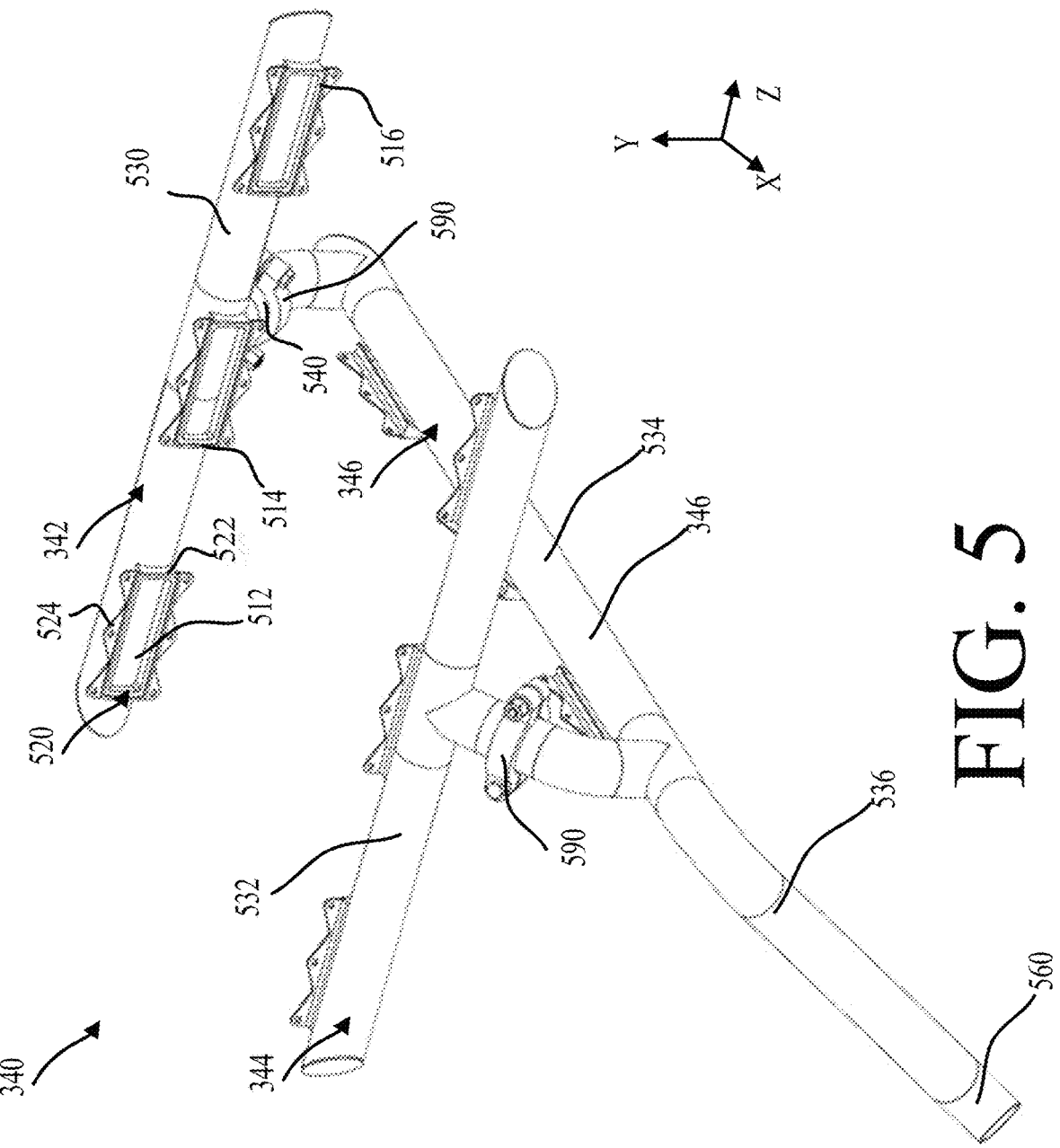
FIG. 5 illustrates a perspective view of at least a portion of an exhaust system for an electrically powered aircraft, in accordance with various embodiments.

Referring now to FIG. 5, a perspective view of the exhaust system 340 (e.g., a portion of the exhaust system 140 from FIGS. 1A-2) of the system 300 from FIGS. 3A and 3B is illustrated, in accordance with various embodiments. In various embodiments, each manifold (e.g., the first exhaust manifold 342, the second exhaust manifold 344, and the common exhaust manifold 346) is coupled to a respective array of battery modules (e.g., the first exhaust manifold 342 is coupled to each battery module in the first array of battery modules 302 from FIGS. 3A and 3B, the second exhaust manifold 344 is coupled to each battery module in the second array of battery modules 304 from FIGS. 3A and 3B, and the common manifold is coupled to each battery module in the third array of battery modules 306 from FIGS. 3A and 3B). In this regard, each manifold includes a plurality of inlets, where a number of inlets for the respective manifold corresponds to a number of battery modules in a respective array of battery modules. For example, the first exhaust manifold 342 comprises a first inlet 512, a second inlet 514, and a third inlet 516. Each inlet for a respective exhaust manifold is configured to be in fluid communication with an internal cavity of a respective battery module in response to a cell in the respective battery module entering thermal runaway.

In various embodiments, each inlet is defined by a respective fitting. A "fitting" as referred to herein is a component configured to couple a fluid conduit in a plumbing system to an adjacent interface (e.g., a vent port of a battery module in the battery system 110 from FIGS. 3A, 3B). For example, the first inlet 512 is at least partially defined by a fitting 520. The fitting 520 comprises a main body 522 and a flange 524. The main body at least partially defines the first inlet 512, and the flange 524 is configured to couple to a respective vent port of a respective battery module. In various embodiments, the main body 522 is configured to be coupled to a fluid conduit of the respective exhaust manifold (e.g., fluid conduit 530 for the first exhaust manifold 342). For example, the main body 522 can be welded, brazed, or otherwise joined to the fluid conduit 530 to create a unitary, non-separable, exhaust manifold (e.g., first exhaust manifold 342), in accordance with various embodiments. In various embodiments, each inlet includes a fitting in accordance with the fitting 520 described with respect to the first inlet 512.

In various embodiments, the fitting 520 can facilitate a transition from a non-cylindrical vent port (e.g., a rectangular vent port) to a cylindrical fluid conduit (i.e., fluid conduit 530). In this regard. manufacturability and cost can be greatly reduced relative to non-cylindrical venting system for battery systems, in accordance with various embodiments.

In various embodiments, the first exhaust manifold 342 comprises an outlet 540. The outlet of the first exhaust manifold 342 is configured to couple to a respective inlet of the common exhaust manifold 346.

In various embodiments, the second exhaust manifold 344 is in accordance with the first exhaust manifold 342. In this regard, by producing one component twice, as opposed to two different components, economies of scale can be realized for the exhaust system 340.

In various embodiments, the common exhaust manifold 346 comprises an inlet corresponding to a respective vent port for each battery module in the third array of battery modules 306 from FIG. 3B, in addition to an inlet for each exhaust manifold (e.g., the first exhaust manifold 342 and the second exhaust manifold 344). In this regard, the exhaust system 340 can have a common exhaust outlet 560. In various embodiments, a common exhaust outlet 560 can facilitate a reduction in weight relative to an exhaust outlet for each array of battery modules. Stated another way the exhaust system 340 comprises a plurality of inlets and only a single outlet, in accordance with various embodiments.

In various embodiments, the first exhaust manifold 342 can be coupled to the common exhaust manifold 346 via a coupling 590 (e.g., a v-band clamp, a fitting, an adapter, etc.). The present disclosure is not limited in this regard. Similarly, the second exhaust manifold 344 can be coupled to the common exhaust manifold 346 via a coupling 590. In this regard, the exhaust manifolds 342, 344, 346 can be fluidly coupled together and include a common exhaust outlet 560 for the exhaust system 340, in accordance with various embodiments.

Referring back to FIG. 3A the fitting 520 of the first inlet 512 is coupled to a first battery module 191 in the first array of battery modules 302, the fitting 520 of the second inlet 514 is coupled to a second battery module 192 in the first array of battery modules 302, and the fitting 520 of the third inlet 516 is coupled to a third battery module 193 in the first array of battery modules 302. In this regard, a vent port of each respective battery module in an array of battery modules is coupled to a respective fitting of a corresponding exhaust manifold (e.g., first exhaust manifold 342, second exhaust manifold 344, or the common exhaust manifold 346) as described previously herein. In various embodiments, each manifold (e.g., first exhaust manifold 342, second exhaust manifold 344, or the common exhaust manifold 346) of the exhaust system 340 is unitary and non-separable. For example, each manifold can include joints (e.g., between a fitting and the fluid conduit), but the joint can merge the two components together (e.g., via welding, brazing, or the like).

In various embodiments, the first exhaust manifold 342 includes a first fluid conduit 530 that extends in the longitudinal direction (i.e., the Z-direction) on a first lateral side of the system, the second exhaust manifold 344 includes a second fluid conduit 532 that extends in the longitudinal direction (i.e., the Z-direction) on a second lateral side of the system, and the common exhaust manifold 346 includes at least a portion of a third fluid conduit 534 that extends laterally from the first lateral side to the second lateral side. A common exhaust manifold 536 can extend from a junction between a fluid conduit extending from the third fluid conduit 534 to the outlet of the second exhaust manifold 344 outward. In this regard, the exhaust manifold 536 can act as a common exhaust outlet for the exhaust system 340 as described previously herein.

Figure 6A:
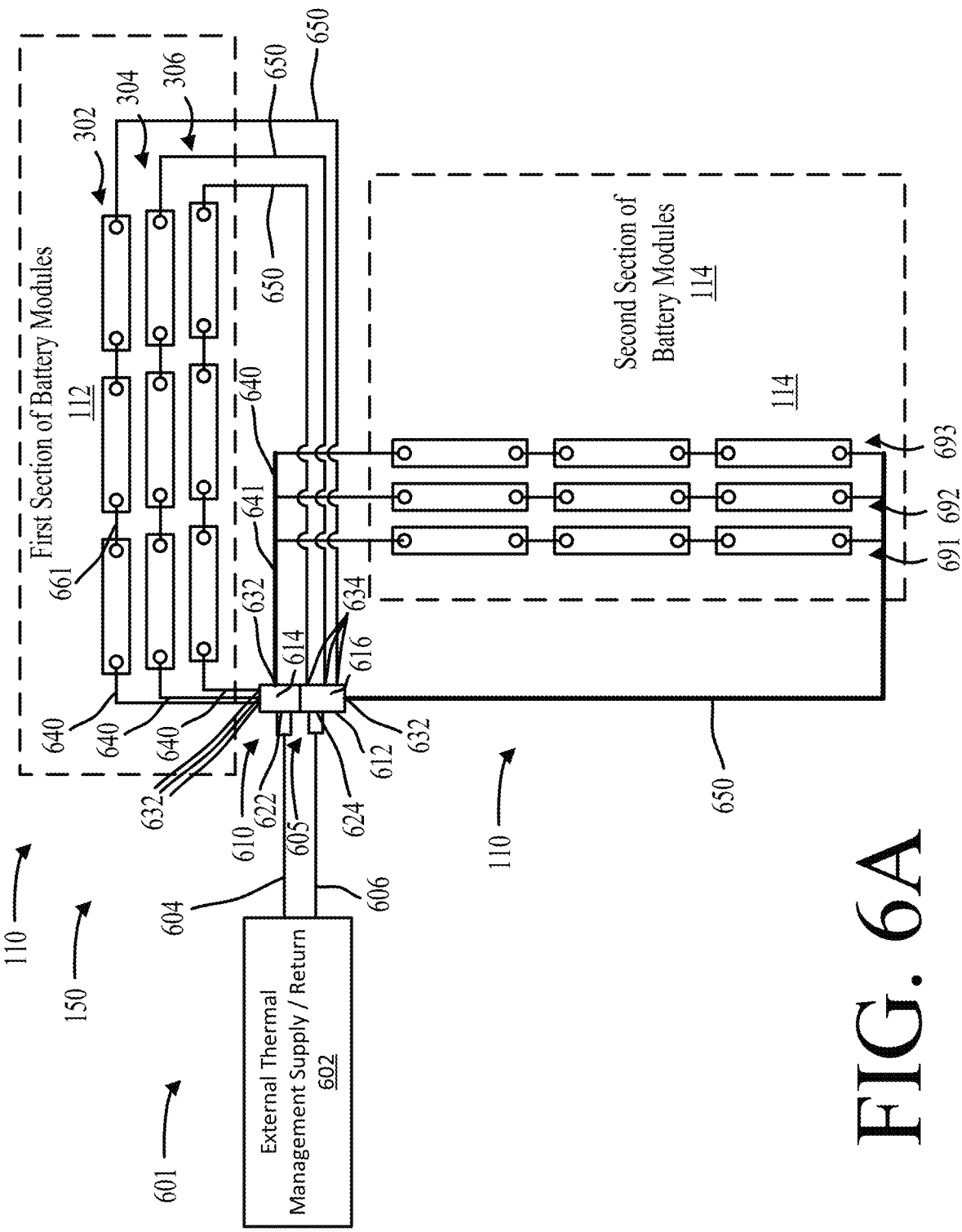
FIG. 6A illustrates a schematic view of a plumbing system and a thermal management system, in accordance with various embodiments.
Figure 6B:
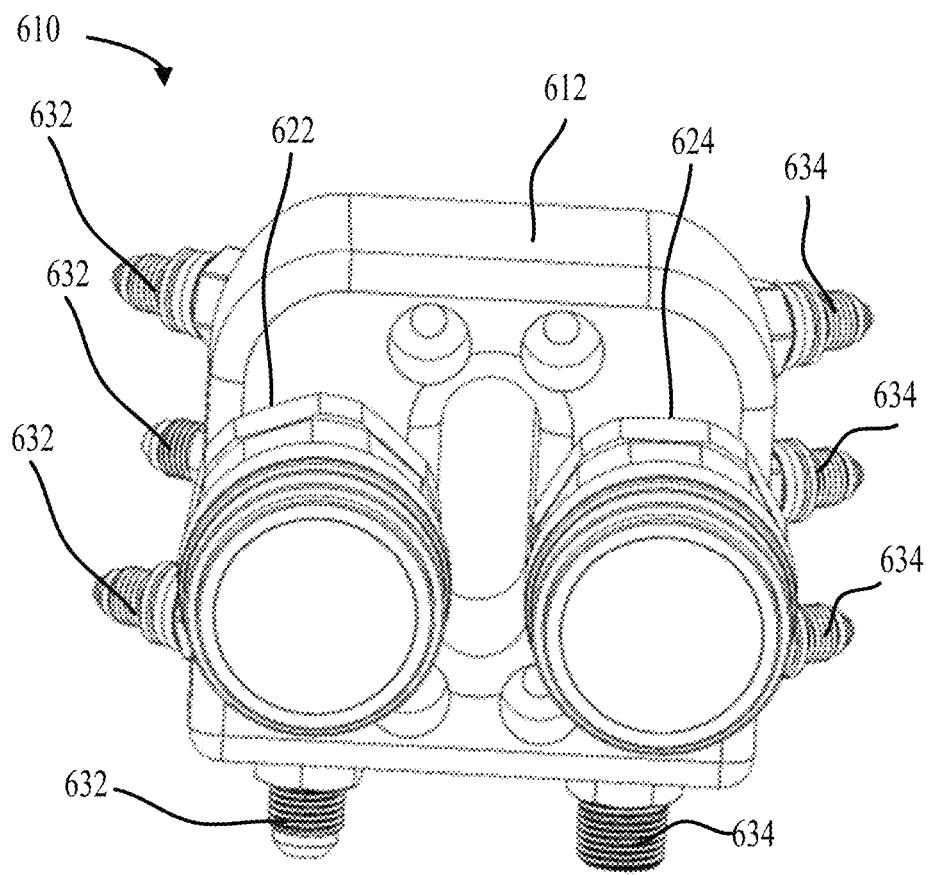
FIG. 6B illustrates a manifold for facilitating an external connection to a thermal management system for an electrically powered aircraft.

Referring now to FIGS. 6A and 6B, a schematic view of a charging thermal management system 601 (FIG. 6A), and a perspective view of a portion of the plumbing system 150 configured to form a portion of the charging thermal management system 601 (FIG. 6B) are illustrated, in accordance with various embodiments. With brief reference back to FIG. 6A, the plumbing system 150 comprises a manifold 610 configured to act as an interface for fluidly coupling the plumbing system 150 of the system 100 to an external thermal management supply/return system (e.g., a refrigerated coolant supply/return). In this regard, the manifold 610 is configured to couple to one or more couplings of a thermal management system (e.g., external thermal management supply/return system 602 from FIG. 6A). In various embodiments, the manifold 610 is coupled to the truss 310 (e.g., via mounting brackets 390 or the like).

Referring back to FIG. 6B, the manifold 610 comprises a main body 612, an external inlet port 622, an external outlet port 624, a plurality of supply ports 632, and a plurality of return ports 634. With combined reference to FIGS. 6A and 6B, the main body 612 of the manifold 610 includes a supply manifold 614 and a return manifold 616. The external inlet port 622 is directly fluidly coupled to the plurality of supply ports 632 through the supply manifold 614. Similarly, the plurality of return ports 634 are each directly fluidly coupled to the external outlet port 624 through the return manifold 616.

With reference now to FIG. 6A, the plumbing system 150 is coupled to the battery system 110 as shown. The plumbing system 150 includes the manifold 610, which acts as a central supply and return for the plumbing system 150. The manifold 610 is configured to couple to one or more couplings of a thermal management system (e.g., the external thermal management supply/return system 602). In this regard, the external thermal management supply/return system 602 can include a supply tank filled with a heat transfer fluid (e.g., a coolant). During charging, the external thermal management supply/return system 602 can pump the heat transfer fluid through the plumbing system 150 as shown in FIG. 6A.

In various embodiments, the thermal management system 601 includes an external supply line 604 and an external return line 606. The external supply line 604 is configured to be fluidly coupled to the external inlet port 622 of the manifold 610 and the external return line 606 is configured to be fluidly coupled to the external outlet port 624 (e.g., via a male/female coupling interface). Although illustrated as having separate couplings, the present disclosure is not limited in this regard. For example, the external supply line 604 and the external return line 606 can include a single coupling configured to fluidly couple the external supply line 604 directly to the external inlet port 622 and fluidly couple the external return line 606 directly to the external outlet port 624.

In various embodiments, the plumbing system 150 includes a plurality of supply lines 640 in fluid communication with the external inlet port 622 of the manifold 610, and a plurality of return lines 650 in fluid communication with the external outlet port 624 of the manifold. In various embodiments, the external supply line 604 and the external return line 606 of the thermal management system 601 are fluidly coupled to the plumbing system 150 in response to coupling the manifold 610 to the one or more couplings 605 of the thermal management system 601.

In various embodiments, the plumbing system 150 includes various fluid circuits. A "fluid circuit" as referred to herein is a fluid path from an inlet of the plumbing system (e.g., an external inlet port 622) to an outlet of the plumbing system 150 (e.g., an external outlet port 624). In various embodiments, each fluid circuit can have a same ending point as a starting point. However, the present disclosure is not limited in this regard. For example, the supply manifold 614 and the return manifold 616 can be separate components in separate areas of the aircraft 10 from FIG. 1A and still be within the scope of this disclosure. However, by having the end point be the same as the starting point, ground maintenance can be simplified, in accordance with various embodiments.

In various embodiments, the first section of battery modules 112 can include a separate and distinct fluid circuit for each array of battery modules. For example, the plumbing system 150 can include a first fluid circuit 661 that is configured to route fluid from the external inlet port 622 of the manifold 610, into the supply manifold 614 of the manifold, through a first supply line in the plurality of supply lines 640, through a cold plate disposed in a first battery module in the array of battery modules 302, through a jumper tube disposed between the first battery module in the array of battery modules 302, through a cold plate disposed in a second battery module in the array of battery modules 302, through a jumper tube disposed between the second battery module and the third battery module of the first array of battery modules 302, through a return line in the plurality of return lines 650 back to the return manifold 616 of the manifold 610, and out the external outlet port 624 of the manifold. In various embodiments, each fluid circuit through the first section of battery modules is in accordance with the first fluid circuit 661.

In contrast to the fluid circuits of the first section of battery modules 112, the fluid circuits of the second section of battery modules 114 can include a common supply line 641 that is configured to supply a fluid from the thermal management system 601 to separate arrays of battery modules (e.g., array of battery modules 691, 692, 693) in parallel, and return the fluid in a common return line 651 from the plurality of return lines 650. In this regard, since the location of the second section of battery modules 114 can be relatively far from the manifold 610 compared to the first section of battery modules 112, it can be more efficient to route the fluid through a common supply line 641 and a common return line 651 and distribute the fluid amongst the various array of battery modules 691, 692, 693 local to the second section of battery modules 114, in accordance with various embodiments. In this regard, the common supply line 641 can be sized at a greater diameter relative to a set of supply lines that supply the fluid in the thermal management system 601 to the first section of battery modules 112.

In various embodiments, as described previously herein, the plumbing system 150 of the system 100 from FIGS. 1A-2 (e.g., an electrically powered propeller system) is without any fluid supply tank. Stated another way, the plumbing system 150 is in no way configured to control a temperature of the battery modules during operation of the aircraft 10 from FIG. 1A. Stated another way, the plumbing system 150 comprises a fully 'off board' source of cooling fluid. The plumbing system 150 is configured to interface with a supply/return system 602 for a thermal management system 601 to control a temperature of the various battery modules in the battery system 110 during charging. Accordingly, a weight of the battery system 110 can be greatly reduced relative to a system with an on-board cooling system for a respective battery system, in accordance with various embodiments. In various embodiments, the plumbing system is filled when first connected before charging the batteries, fluid is circulated from outside the aircraft, and fluid is drained after charging is complete, thus reducing weight of the system when the aircraft is moving. In various embodiments, the plumbing system is circulated directly from the external supply/return system (i.e., without a filling step), and any remainder is purged after a fluid circulation step.

Figure 7A:
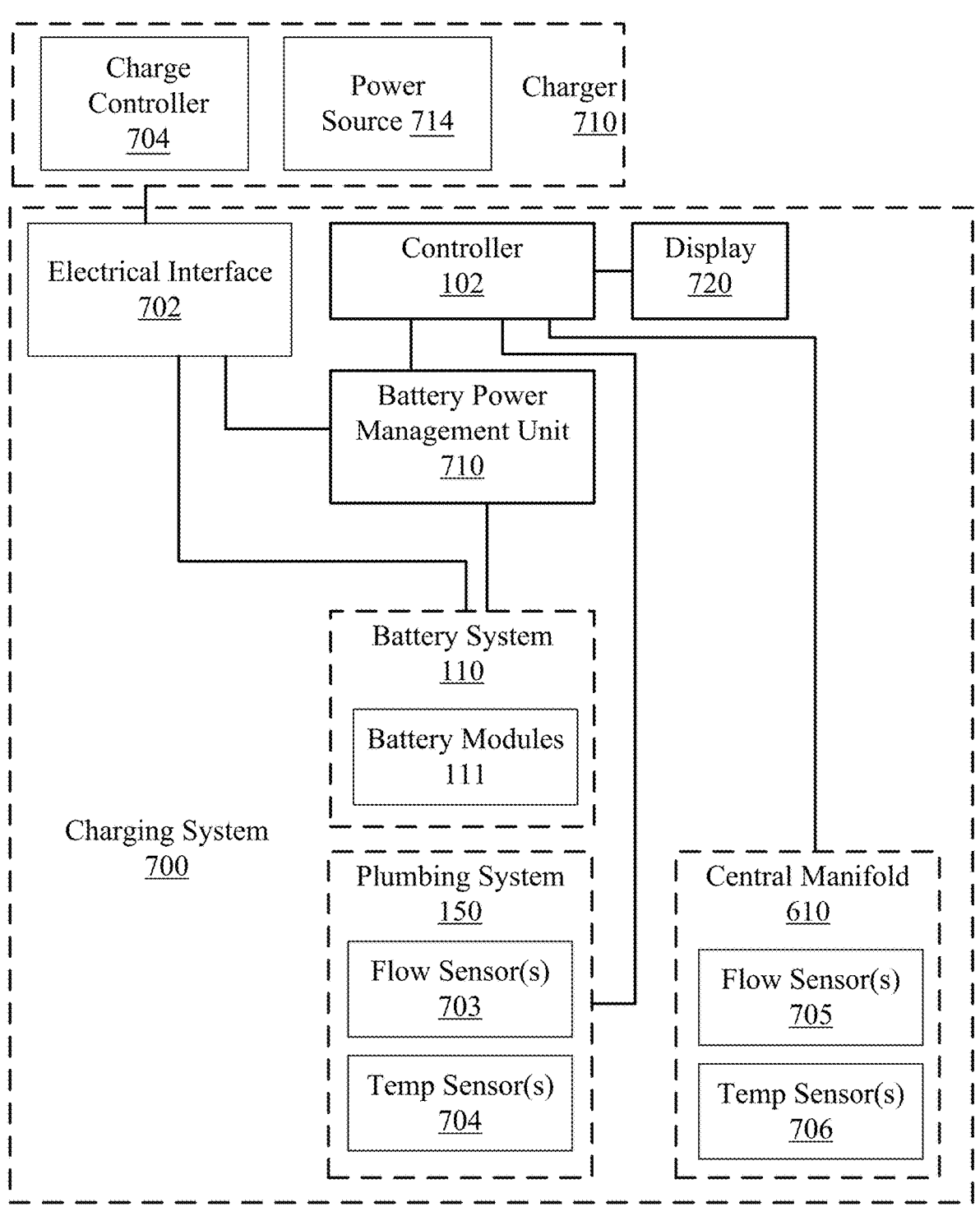
FIG. 7A illustrates a charging system for an aircraft, in accordance with various embodiments.

Referring now to FIG. 7A, a schematic view of an electrical system for a charging system 700 is illustrated, in accordance with various embodiments. The charging system 700 can include each battery module 111 in the battery system 110, an electrical interface 702, sensors (e.g., flow sensors 703 and/or temperature sensors 704) distributed throughout the plumbing system 150 (e.g., within various fluid lines), sensors (e.g., flow sensor(s) 705) and/or temperature sensor(s) 706) disposed within the manifold 610, a battery power management unit 710, the controller 102, and a display 720 (e.g., a cockpit display and/or a maintenance display), in accordance with various embodiments. The electrical interface 702 can be in electrical communication with the battery system 110 and/or the battery power management unit 710 and configured to facilitate charging of the battery system 110. In various embodiments, the electrical interface 702 is a charging interface configured to interface with a charging controller 701 and/or an external power source 703 configured to charge the battery system 110.

In various embodiments, the electrical interface 702 is configured to interface with a charger 710. The charger 710 can include a charge controller 712 and a power source 714. The charger 710 is configured to be coupled to the electrical interface 702 to facilitate a charging of the battery system 110, in accordance with various embodiments.

As described previously herein, the plumbing system 150 can include flow sensor(s) 703 and/or temperature sensor(s) 704 distributed throughout the plumbing system 150. For example, each fluid line in the plumbing system 150, or a set of fluid lines in the plumbing system can include a respective sensor (or sensors) (e.g., at least one temperature sensor 704 and/or at least one flow sensor 703 per flow circuit). In this regard, the thermal management system 601 from FIG. 6A can be monitored during charging as described further herein.

In various embodiments, the flow sensor(s) 703, 705, the temperature sensor(s) 704, 706, the battery power management unit 710 and the battery system 110 (e.g., through the battery power management unit 710 or directly) are in electrical communication with the controller 102. The controller 102 is configured to monitor a charging process of the battery modules 111 in the battery system 110. For example, with reference now to FIG. 7B, a process 750 for monitoring the charging system 700 is illustrated, in accordance with various embodiments.

Figure 7B:
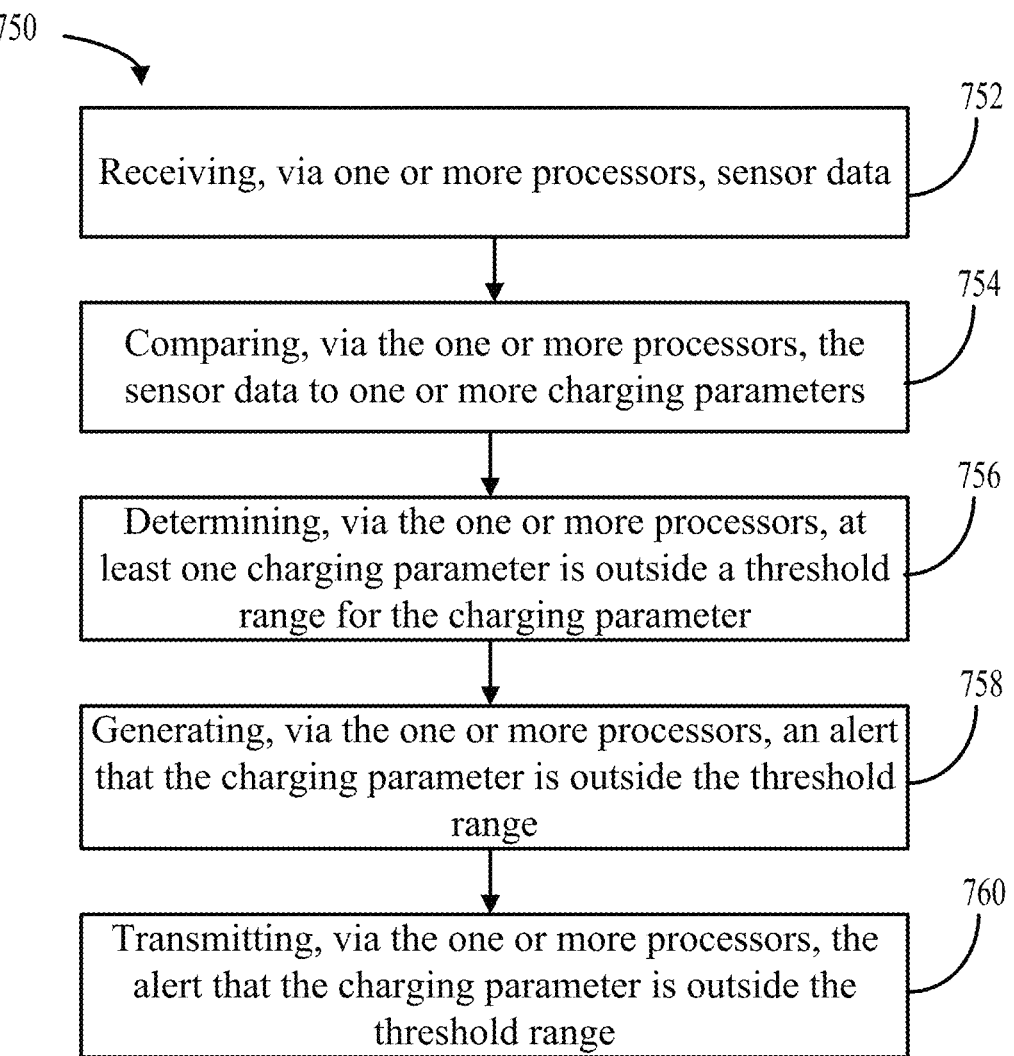
FIG. 7B illustrates a process performed by a charging system, in accordance with various embodiments.

With combined reference now to FIGS. 7A and 7B, the process 750 can comprise receiving, via one or more processors (e.g., the controller 102), sensor data from a plurality of sensors (e.g., flow sensors 703, 705, temperature sensors 704, 706, internal sensors from each battery module in the battery modules 111, etc.) (step 752).

The process 750 can further comprise comparing, via the one or more processors, the sensor data to one or more charging parameters (step 754). In various embodiments, the sensor data can be compared directly, or the sensor data can be used to calculate various charging parameters. The present disclosure is not limited in this regard.

The process 750 can further comprise determining. via the one or more processors. at least one charging parameter in the one or more charging parameters to a threshold range for the charging parameter (step 756). For example, flow rates and/or local temperature readings throughout the plumbing system 150 can be compared to a threshold range for flow rates and/or temperature expected during charging of the battery system 110. In this regard, local temperature readings can be compared with a table of anticipated temperature readings given an ambient temperature during charging (e.g., from an environmental sensor or internal cabin temperature of the aircraft 10 from FIG. 1A), a charging current level as communicated through the electrical interface 701, and/or any other information provided to the controller 102 during charging of the battery system 110, such as supply flow rate, supply coolant temperature, return coolant temperature, etc.

The process 750 can further comprise generating, via the one or more processors, an alert that the charging parameter is outside the threshold range in response to determining the charging parameter is outside the threshold range (step 758) and transmitting, via the one or more processors, the alert that the charging parameter is outside the threshold range to the display device 720 (step 760). For example, in response to a flow rate (or temperature) in a respective branch within the plumbing system 150 dropping below (or above) a threshold range for the flow rate (or the temperature), an alert indicating which branch is experiencing the abnormal flow rate (or temperature) can be generated. In this regard, action can be taken to address the issue by maintenance, prior to the aircraft 10 from FIG. 1A taking off, in accordance with various embodiments.

Sensing devices may be located throughout the cooling branches to indicate whether there is proper flow in each branch. Each battery module can include temperature sensing internally (i.e., for typical operations), software may be used to monitor module temperatures in each of the branches during charging. These temperatures can be compared with a table of anticipated temperatures given a certain ambient air temperature during charging, internal cabin temperature, charging current level, and other information that may be provided to the aircraft from the refrigeration system such as flow rate, supply coolant temperature, return coolant temperature, or other data. The processing of such information can determine if the coolant system is performing properly without any obstructions or limitations, as described further herein.

In various embodiments, the process 750 may comprise adjusting the flow rate of the fluid, or adjusting the charge rate of the batteries based on the comparison of the sensor data to one or more charging parameters and determination associated therewith. In this regard, the one or more processors can be the controller 102 of the aircraft 10 or the one or more processor can be a part of the charge controller 701, in accordance with various embodiments. The present disclosure is not limited in this regard.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment: for example. A and B, A and C, B and C, or A and B and C. Different cross-hatching is used throughout the figures to denote different parts but not necessarily to denote the same or different materials.

Systems, methods, and apparatus are provided herein. In the detailed description herein. references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for an electrically powered aircraft, comprising:

a truss configured to couple to a structure of an aircraft;

a battery system supported by the truss, the battery system including a first array of battery modules and a second array of battery modules, the first array of battery modules operably coupled to the second array of battery modules;

an exhaust system including a first exhaust manifold, a second exhaust manifold, and a common exhaust manifold, the first exhaust manifold coupled to each battery module in the first array of battery modules, the second exhaust manifold coupled to each battery module in the second array of battery modules, and the first exhaust manifold and the second exhaust manifold each coupled to the common exhaust manifold; and a plumbing system fluidly coupled to the battery system, the plumbing system including a manifold configured to couple to one or more couplings of a thermal management system, wherein the plumbing system includes a plurality of supply lines in fluid communication with an inlet port of the manifold, and a plurality of return lines in fluid communication with an outlet port of the manifold, and wherein a supply line and a return line of the thermal management system are fluidly coupled to the plumbing system in response to coupling the manifold to the one or more couplings of a supply/return system of the thermal management system.

2. The system of claim 1, wherein the truss comprises an aft truss structure configured to couple to the structure of the aircraft, and a forward truss structure coupled to the aft truss structure, the forward truss structure configured to couple to a motor mount.

3. The system of claim 2, wherein the forward truss structure and the aft truss structure are distinct and separable components.

4. The system of claim 2, wherein the aft truss structure includes a first mounting arrangement and a second mounting arrangement, the first mounting arrangement disposed at a forward end of the aft truss structure and the second mounting arrangement disposed at an aft end of the aft truss structure.

5. The system of claim 4, wherein the first mounting arrangement of the aft truss structure is coupled to the forward truss structure, and the second mounting arrangement of the aft truss structure is configured to couple to the structure of the aircraft.

6. The system of claim 1, further comprising a first fluid circuit, a second fluid circuit, and a third fluid circuit, wherein:

the first fluid circuit extends from the inlet port through a first supply line, through the first array of battery modules, through a first return line and out the outlet port, the second fluid circuit extends from the inlet port through a second supply line, through the second array of battery modules, through a second return line, and out the outlet port, and the third fluid circuit extends from the inlet port through a third supply line, through a third array of battery modules, through a third return line, and out the outlet port.

7. The system of claim 1, wherein the plumbing system is without a fluid supply tank.

8. The system of claim 1, wherein the first exhaust manifold comprises a first inlet, a second inlet, a third inlet, and an outlet.

9. The system of claim 8, wherein:

the first inlet is coupled to a first battery module in the first array of battery modules, the second inlet is coupled to a second battery module in the first array of battery modules, and the third inlet is coupled to a third battery module in the first array of battery modules.

10. The system of claim 1, wherein the first exhaust manifold is a unitary and non-separable.

11. The system of claim 1, wherein:

the battery system further comprises a third array of battery modules coupled to the truss, and the first array of battery modules and the second array of battery modules are aligned in a longitudinal direction.

12. The system of claim 11, wherein:

the third array of battery modules is aligned in a lateral direction and coupled to the common exhaust manifold, the first exhaust manifold, the second exhaust manifold, and the common exhaust manifold are distinct components, the first exhaust manifold includes a first fluid conduit that extends in the longitudinal direction on a first lateral side of the system, the second exhaust manifold includes a second fluid conduit that extends in the longitudinal direction on a second lateral side of the system, and the common exhaust manifold includes at least a portion of a third fluid conduit that extends laterally from the first lateral side to the second lateral side.

13. The system of claim 1, further comprising:

an electric motor operably coupled to the battery system, wherein the battery system is configured to provide power to the electric motor; and a propeller operably coupled to the electric motor.

14. The system of claim 1, further comprising:

a plurality of sensors disposed within the plumbing system; and a controller in electronic communication with the plurality of sensors.

15. The system of claim 14, wherein the controller is configured to:

receive sensor data from the plurality of sensors;

compare the sensor data to one or more charging parameters;

determine at least one charging parameter is outside a threshold range for the charging parameter; and generate an alert that the charging parameter is outside the threshold range in response to the determining the at least one charging parameter is outside the threshold range for the charging parameter.

16. The system of claim 15, further comprising a display device in electronic communication with the controller, wherein the controller is further configured to transmit the alert to the display device.

17. The system of claim 15, wherein the controller is further configured to receive internal battery module data from each battery module in the battery system while receiving the sensor data.

18. A system for an electrically powered aircraft, comprising:

a truss configured to couple to a structure of an aircraft;

a battery system supported by the truss, the battery system including a first array of battery modules and a second array of battery modules, the first array of battery modules operably coupled to the second array of battery modules;

an exhaust system including a first exhaust manifold, a second exhaust manifold, and a common exhaust manifold, the first exhaust manifold coupled to each battery module in the first array of battery modules, the second exhaust manifold coupled to each battery module in the second array of battery modules, and the first exhaust manifold and the second exhaust manifold each coupled to the common exhaust manifold, wherein the battery system further comprises a third array of battery modules coupled to the truss, wherein the first array of battery modules and the second array of battery modules are aligned in a longitudinal direction, wherein the third array of battery modules are aligned in a lateral direction and coupled to the common exhaust manifold, wherein the first exhaust manifold, the second exhaust manifold, and the common exhaust manifold are distinct components, wherein the first exhaust manifold includes a first fluid conduit that extends in the longitudinal direction on a first lateral side of the system, wherein the second exhaust manifold includes a second fluid conduit that extends in the longitudinal direction on a second lateral side of the system, and wherein the common exhaust manifold includes at least a portion of a third fluid conduit that extends laterally from the first lateral side to the second lateral side.

19. A system for an electrically powered aircraft, comprising:

a truss configured to couple to a structure of an aircraft;

a battery system supported by the truss, the battery system including a first array of battery modules and a second array of battery modules, the first array of battery modules operably coupled to the second array of battery modules;

an exhaust system including a first exhaust manifold, a second exhaust manifold, and a common exhaust manifold, the first exhaust manifold coupled to each battery module in the first array of battery modules, the second exhaust manifold coupled to each battery module in the second array of battery modules, and the first exhaust manifold and the second exhaust manifold each coupled to the common exhaust manifold;

a plumbing system in fluid communication with the battery system, the plumbing system including a plurality of sensors disposed therein; and a controller in electronic communication with the plurality of sensors, the controller configured to:

receive sensor data from the plurality of sensors;

compare the sensor data to one or more charging parameters;

determine at least one charging parameter is outside a threshold range for the charging parameter; and generate an alert that the charging parameter is outside the threshold range in response to the determining the at least one charging parameter is outside the threshold range for the charging parameter.

\* \* \* \* \*